June 23, 1942. A. W. KROGMAN 2,287,526
OIL FILTER
Filed Oct. 25, 1941
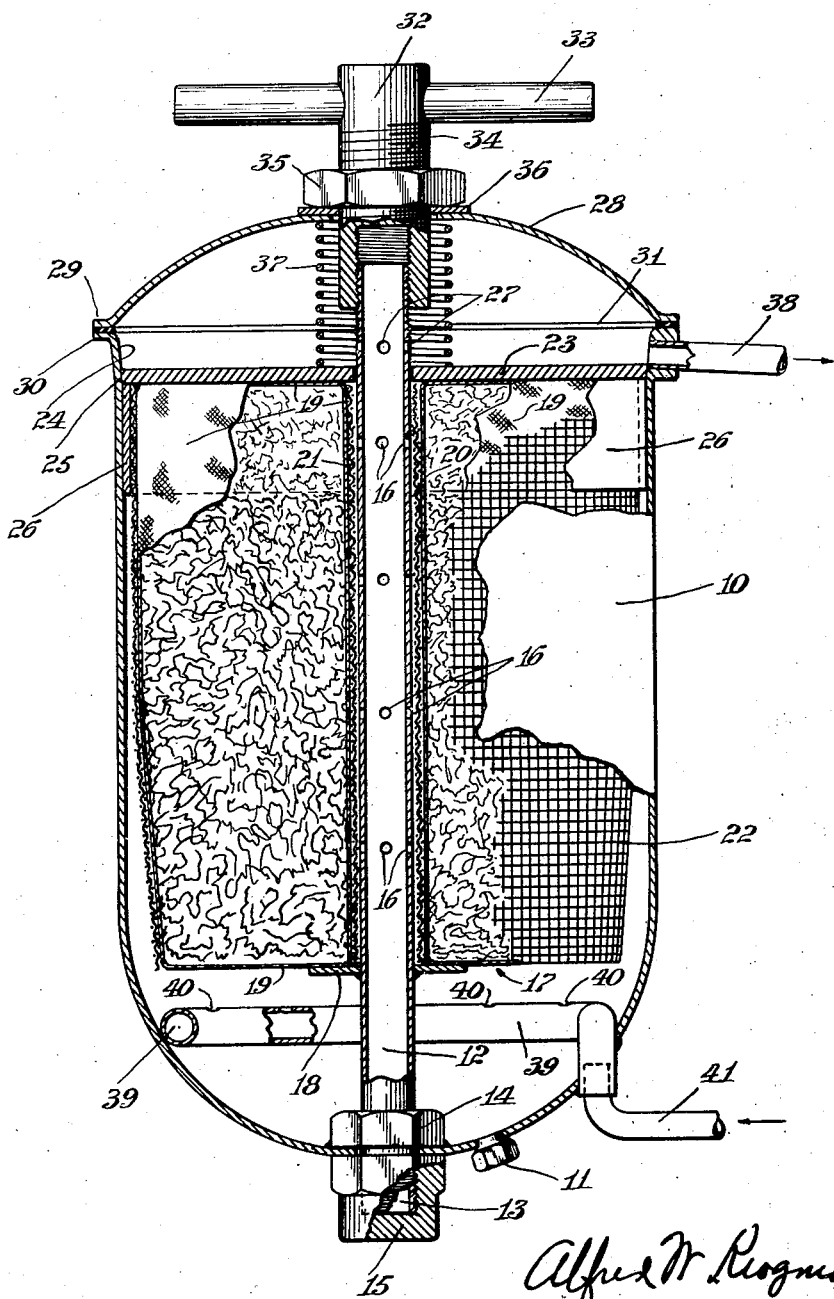

Patented June 23, 1942

2,287,526

UNITED STATES PATENT OFFICE 2,287,526

OIL FILTER

Alfred W. Krogman, West Long Branch, N. J.

Application October 25, 1941, Serial No. 416,489

12 Claims. (Cl. 210—140)

The invention relates to oil filters, and more particularly to a pressure feed filter for use in lubricating systems for internal combustion and other engines.

Various filters of the general type to which the invention relates are in extensive use, some of such filters being of the sealed casing, and others of the replaceable filter cartridge, type.

In lubricating oil systems now generally used in connection with internal combustion engines, oil is delivered by an oil pump arranged in the sump of the engine to the various bearings in and about the engine, after having been passed through a filter for removing solids and various other impurities collected during the passage of the oil from the various bearings and other surfaces with which it comes in contact during its circulation from the oil pump back to the oil sump, and returned to the sump. Such oil frequently develops some water, impairing its lubricating properties and making it undesirable to deliver the circulated oil with such water content to the various bearings.

With the above conditions in mind, I have provided a filter for use in a circulating lubricating oil system which will effectively remove impurities from the oil and permit a continued flow of the oil from the various engine parts back to the sump in sufficient volume to ensure reliability in the functioning of the lubricating oil system irrespective of operating conditions of the engine requiring variance in the supply of lubricating oil.

In securing the desired filter operation, I have found it highly desirable to utilize a high percentage of the filter body at all times, thus effecting a wide distribution of impurities contained in the oil throughout this body and permitting the passage of the oil therethrough with a minimum likelihood of the oil being delivered to the engine and other bearings having impurities imparted thereto from the filter body itself.

I have also found it desirable to provide an oil delivery pipe having an outlet capacity sufficiently great and so distributed as to minimize turbulence of the oil being delivered to the filter and the resultant frothing thereof to an extent to interfere with a proper operation of the filter and the free circulation of the oil through the filter body. The oil to be filtered accumulates at the bottom of the filter casing and about the sides thereof, and is always under pressure while the oil pump is in operation, so as to flow through every portion of the filter body exposed to the oil within this bottom or feed chamber and about the outside wall of the filter body.

The filter of the invention is of the replaceable cartridge type, and the various details of construction are such as to permit the convenient removal of a filter body from the casing and its replacement by a new cartridge, the construction being such as to provide an effective seal at the top of the filter body so as to permit the formation of a chamber at the top of the casing for the filtered oil without likelihood of any oil from the feed pipe entering this chamber until it has passed through the filter body.

Between the filter body and the top or filtered oil chamber is a standpipe having a plurality of openings therethrough communicating with various portions of the filter body at different horizontal levels, and also having one or a plurality of small discharge openings therethrough located within the filtered oil chamber, so that oil, after flowing through the filter body, can enter this pipe at widely divergent points, and any impurities in the oil, including water, may be separated from the oil and settle in the bottom of this standpipe where it may be withdrawn from time to time.

In the filter of the invention, the filter body or cartridge is supported within the outer casing away from the bottom and the sides thereof, and is held against displacement by the pressure of the inflowing oil by means exerting controllable pressure upon the top of the cartridge so as to avoid any possibility of the collapsing or distortion of the filter body or cartridge.

The top or filtered oil chamber has a closure separable or removable from the main portion of the casing, the means for securing this closure requiring no flange bolts of any kind. The arrangement is such that this chamber is both air and fluid tight, so as to ensure continuity in the flow of the oil therethrough to the engine parts.

The means forming the bottom of the top or filtered oil chamber bears directly upon the top of the filter body or cartridge and has a close fit about the edge thereof with the casing, and a close fit with the standpipe, so as to completely separate the top chamber from the casing and limit the flow of oil to the top or filtered oil chamber to that entering said standpipe after passing through said filter body.

The invention consists primarily in an oil filter embodying therein a casing, a standpipe withing and projecting above said casing, a filter body within said casing about said standpipe, said standpipe having a plurality of spaced openings therethrough communicating with said filter body on different horizontal levels, means supporting said filter body away from the bottom of said casing to form a feed chamber, means forming a filtered oil chamber above said casing including a partition plate mounted upon said standpipe adjacent the top of said casing, and a removable closure for said casing forming, with said plate, the filtered oil chamber, said standpipe having an opening therethrough communicating with said filtered oil chamber, an oil outlet for said last named chamber, and oil delivery means comprising a pressure feed pipe within the feed chamber having a plurality of outlet openings in its length, whereby oil is delivered to said chamber at a plurality of points and with low velocity; and in such other novel features of construction and combination of parts as are hereinafter set forth and described, and more particularly pointed out in the claims hereto appended.

In the accompanying drawing, I have illustrated, partly in section and partly in elevation, an oil filter embodying the invention.

In the accompanying drawing, the casing body is shown at 10, this casing having a rounded bottom, as shown, provided with a drain opening closed by means of a plug 11.

Extending upwardly through said casing is a standpipe 12 which passes through the bottom of said casing as shown at 13. The lower end of said pipe is screw threaded so as to accommodate a lock nut 14 and a cap nut 15, the removal of which will permit the escape of matter within said pipe.

This pipe 12 has a plurality of openings 16 therethrough, said openings being arranged at different horizontal levels so as to permit delivery of filtered oil into said pipe at various points to the filter body within said casing 10. The number, size and arrangement of these openings will vary according to the desired capacity of the filter.

Within the portion 10 of the filter casing is a filter body 17 supported from a plate 18 carried by the standpipe 12 and positioned well above the curved bottom of said portion 10 so as to locate the filter body well above said curved bottom and form a chamber for the feed oil delivered to the filter under pressure, or a feed chamber.

I have found that a filter body composed of fibrous material such as cotton staple or cotton waste secures highly satisfactory results as it not only permits the free flow therethrough of the oil to be filtered, but will separate impurities in the form of solids, and even water, from the oil, because of the porosity of such a mass and its absorption of lighter liquids.

The cotton or other filtering material is given form by means of a woven bag 19 completely enveloping the filtering material. This bag, and the filtering material, has a central opening therethrough, indicated at 20, so that the filter body in its entirety may be mounted upon the standpipe 12 and supported from the plate 18. The central opening in this filter body is reinforced by a wire tube 21, and a similar wire mesh forms an outer wall 22 for the cartridge, preventing outward bulging of the filter body proper. The wire mesh is used merely to give the desired form to the filter body or cartridge and to preserve this form.

Since the cartridge is supported by the engagement of the wire tubing 21 and the contiguous portion of the filtering material, with the plate 18, vertical compression of the filtering material is prevented without the use of a wire covering for the bottom or the top of the filter body.

The woven fabric bag prevents the fibrous material from escaping into the feed chamber at the bottom of the casing 10.

To permit the utilization of a high percentage of the filtering material, I space the outer wall of the cartridge away from the side wall of the casing 10, so that oil delivered to the pressure feed chamber will circulate about this cartridge. Preferably, this is done by providing a cartridge having an inward taper toward the bottom thereof, so as to provide a space about the cartridge of gradually decreasing capacity toward the top thereof.

In this manner, the oil under pressure accumulated in the feed oil chamber will flow upwardly through the bottom of the cartridge, and inwardly from the side of the cartridge, the pressure upon the oil saturated body of the filter causing it to flow towards its only point of escape, to wit: the openings 16 in the standpipe 12. No oil can enter the standpipe unless it has passed through some portion of the filter body, since the supporting plate 18 effectively prevents oil from entering any space which may be present about the standpipe.

The top of the filter body is engaged by a partition plate 23, the perimeter of which has a close fit with the inner wall of the casing 10 adjacent the top thereof. If desired, this portion of the wall of said casing may be inwardly flared slightly, as shown at 24, and the perimeter of said partition plate 23 may be slightly beveled, at 25, so as to ensure a substantially oil proof joint between this plate and the wall of the casing.

To guard against any tendency of the oil to flow upwardly about the cartridge toward this joint, I provide a packing band 26 about the top of the cartridge outside of the wire mesh 22, this portion of the cartridge and the adjacent portion of the casing 10 being cylindrical in form. This band is of cheesecloth or other woven fabric offering sufficient resistance to the flow of oil therethrough to protect said joint.

The standpipe 12 is provided with outlet openings 27 above the plate 23, so that oil flowing upwardly through this pipe is delivered to the filtered oil chamber formed above said plate 23.

Closing the top of the casing 10 is a dome shaped closure 28 having a flange 29 engaging an outturned flange 30 upon the top of the casing. Between these flanges is a packing ring 31 which makes said filtered oil chamber both air and liquid tight.

The upper end of the pipe 12 is provided with exterior screw threads co-operating with which is an adjusting nut 32 having an operating handle 33. This nut is provided with exterior screw threads 34, co-operating with which is a lock nut 35 engaging a packing washer 36 conforming to and bearing against the top of the closure 28 so as to form a gas and liquid tight joint about the nut 32 at this point.

Encircling said nut 32 is a coiled spring 37, one end of which is seated upon the partition plate 23 and the other end of which bears upon the inner wall of the closure 28. This spring prevents possible displacement of the partition plate 23.

By the foregoing description it is apparent that a filter embodying the invention includes therein a casing 10 having a feed oil chamber at the bottom thereof and extending upwardly about a filter body or cartridge within this casing, and a filtered oil chamber separated from said feed oil chamber and in communication therewith solely through a central standpipe passing vertically through the cartridge and communicating therewith at various levels, this pipe being the only channel for the oil delivered to the feed chamber, to flow into the filtered oil chamber after passing through the filter body.

Leading from the lower portion of the filtered oil chamber is a discharge pipe 38, which pipe ordinarily leads to the mechanisms to be lubricated by the filtered oil.

Positioned within the feed oil chamber is the oil delivery means comprising a pressure feed pipe 39 in the form of a loop, this pipe having therein a plurality of upwardly directed openings 40, the aggregate capacity of which is greater than that of a feed pipe 41 leading from the oil pump.

The arrangement of these openings is not only such as to ensure the delivery of the oil to be filtered at widely divergent points, but to reduce the force of the emission of such oil in a manner to avoid such turbulence as will develop a froth within the feed oil chamber which might interfere with the free flow of the oil through the surface portion of the filter body. This might have a two-fold effect, to wit: limit the capacity of the filter body as a whole, or develop excessive local pressures tending to carry undesired impurities through the filter body instead of preventing the passage of such material therethrough.

The operation of a filter embodying the invention is substantially as follows:

The filter of the invention is shown and described as a part of a lubricating oil system for an internal combustion or similar engine where, with the operation of the engine, the lubricating oil is withdrawn from the oil sump, passed under pressure through a filter, and from the filter to the engine parts, and thence back to the oil sump. While the filter may be used in other connections, the above is its chief field of utility.

With the operation of an oil pump, oil under pressure is delivered through the pipe 41 to the pressure feed pipe 39 in the feed oil chamber. As the oil enters this pipe, there will be a reduction in the pressure, due to the number and size of the various openings 40 in the pipe.

With a rapid delivery of oil through said pipe 39, said feed oil chamber and the space about the filter cartridge 17 will be filled with the oil, and this oil, with the pressure developed from the continuing flow of oil to said chamber, is forced through the filter body, not only vertically of said body but inwardly from the side thereof toward the pipe 12, thus utilizing a very high percentage of said filter body and affording a large surface area for the entrapment of foreign matter in the oil.

The pressure within the pipe 12 and the filtered oil chamber at the top of the filter will be lower than that in the feed oil chamber itself, so that oil will flow from the filter body through the various openings 16 in said pipe until said pipe is filled with oil, and such oil, after filtration, is delivered through the openings 27 into the chamber above the plate 23, from whence it will flow through the discharge pipe 38 to the engine or other point of delivery of the filtered oil.

With the delivery of oil to the filtered oil chamber, air contained in said chamber may be compressed, since this chamber is both oil and air tight, thus ensuring a continuing uniform feed of the oil through the discharge pipe 38.

The oil, in flowing through the filter, passes at various angles and in various directions to the openings 16, but the mass of the filter body, the flow of oil thereinto throughout a wide surface area thereof, and the accumulated oil in the filtered oil chamber, coupled with the resistance to the flow of oil through the discharge pipe 38, ensures an effective operation of the filter with a minimum of likelihood of impurities being carried into the pipe 12 and therethrough into the filtered oil chamber with which said pipe communicates.

After long continued operation, however, there is always a possibility of some impurities, including water, being carried into said pipe, but the wide diversity in the points of delivery of the oil in small volume to this pipe will avoid a rapid flow of the oil from said pipe into the filtered oil chamber and afford a settling period sufficient to cause such impurities to accumulate toward the bottom of the pipe 12, which has no communication with the feed oil chamber. From time to time, such impurities may be withdrawn from said pipe by removing the cap nut 15.

The capacity of the feed oil chamber and the slow rate of flow of the oil therefrom through the filter body will also permit the separation of some of the impurities by settling while the oil is in this chamber, the plug 11 being provided to permit the draining of impurities which may accumulate within the bottom of said chamber.

By using an oil feed pipe 39 having the spaced openings 40 as described, no oil jets, such as would cause any substantial turbulence in the oil accumulated in this chamber, will be formed, and hence there will be no frothing in the chamber due to the violent emission of oil from said pipe.

A filter of substantially the dimensions shown in the accompanying drawing may be continuously operated over long time intervals without such clogging of the filter body at any point of entry of the oil thereinto as will impair the action of the filter, since the flow of the total volume of oil passing therethrough is at so many points that the clogging of any one point will cause no appreciable reduction in the volume of oil passing through the filter body.

When it becomes necessary to replace a partially clogged filter cartridge, the nut 32 is unscrewed from the upper end of the standpipe 12 and the top closure 28 and spring 37 are removed from the casing 10. This exposes the plate 23, which may then be removed from said casing by sliding movement along the pipe 12. The filter body 17 may be then drawn through the open top of said casing 10 and a fresh cartridge substituted. The closure 28 and spring 37 are then replaced and the nut 32 actuated to firmly seat said closure and tension the spring 37. This spring has sufficient tension to prevent any movement of the plate 23 from pressures developed within the casing 10.

When a cartridge has been removed, another may be replaced by merely slipping it over the standpipe 12 until the lower end of the reinforcing wire mesh tubing 21 engages the plate 18, which is permanently connected with said pipe 12. Thereupon, the partition plate 23 is again mounted upon the pipe 12 and the closure 28 forced downwardly until its flange 29 engages the gasket 31. This movement is against the tension of the spring 37.

The lock nut 35 is used to seat the washer 36 in a manner to form an air and liquid tight joint about the opening through the top of said dome shaped closure, through which the nut 32 passes. It also prevents any accidental loosening of the nut 32 and resulting looseness of the plate 23.

The wire tubing 21 and the wire mesh forming the outer wall 22 of the filter body or cartridge are merely stiffening members to prevent distortion of this body. The mesh of both of these members is sufficiently coarse to avoid the presence of any straining action or to contribute toward any substantial clogging of the pores at the surface of said filter body.

A wide distribution of the delivery of oil to the feed oil chamber is an essential characteristic of the filter, as is the construction and function of the standpipe 12. The provision of two chambers at the opposite ends of a filter casing and the use of a standpipe which provides the only channel of communication between a filter body receiving oil from the feed oil chamber and the chamber for the accumulation of filtered oil, are also important features of the filter and contribute in large measure toward the desired operation thereof in securing the desired volume of flow of the oil through the filter. By delivering oil to said pipe through a plurality of openings communicating with different portions of said filter body, any well defined path of the oil passing through said body is avoided, and an effective utilization of a high percentage of said body is assured.

The dimensions of a filter embodying the invention may vary according to the pressure at which it operates or the capacity required for its particular condition of use.

It is not my intention to limit the invention to the precise details of construction and combination of parts shown and described, it being apparent that such may be varied without departing from the spirit and scope of the invention.

Having described the invention, what I claim as new and desire to have protected by Letters Patent, is:

1. An oil filter embodying therein a casing, a standpipe within and projecting above said casing, a filter body within said casing about said standpipe, said standpipe having a plurality of spaced openings therethrough communicating with said filter body on different horizontal levels, means supporting said filter body away from the bottom of said casing to form a feed chamber, means forming a filtered oil chamber above said casing including a partition plate mounted upon said standpipe adjacent the top of said casing, and a removable closure for said casing forming, with said plate, the filtered oil chamber, said standpipe having an opening therethrough communicating with said filtered oil chamber, an oil outlet for said last named chamber, and oil delivery means comprising a pressure feed pipe within the feed chamber having a plurality of outlet openings in its length, whereby oil is delivered to said chamber at a plurality of points and with low velocity.

2. An oil filter embodying therein a casing, a standpipe within and projecting above said casing, a tapered filter body within said casing about said standpipe, said standpipe having a plurality of spaced openings therethrough communicating with said filter body on different horizontal levels, means supporting said filter body away from the bottom of said casing to form a feed chamber below said filter body and of progressively decreasing capacity about said filter body toward the top thereof, means forming a filtered oil chamber above said casing including a partition plate mounted upon said standpipe adjacent the top of said casing, and a removable closure for said casing forming, with said plate, the filtered oil chamber, said standpipe having an opening therethrough communicating with said filtered oil chamber, an oil outlet for said last named chamber, and oil delivery means comprising a pressure feed pipe within the feed chamber having a plurality of outlet openings in its length, whereby oil is delivered to said chamber at a plurality of points and with low velocity.

3. An oil filter embodying therein a casing, a standpipe within and projecting above said casing, a tapered filter body within said casing about said standpipe, a wire mesh tube centrally of said filter body having a close fit with said standpipe, and a wire mesh forming the outer wall of said body, said standpipe having a plurality of spaced openings therethrough communicating with said filter body on different horizontal levels, means supporting said filter body away from the bottom of said casing to form a feed chamber below said filter body and of progressively decreasing capacity about said filter body toward the top thereof, means forming a filtered oil chamber above said casing including a partition plate mounted upon said standpipe adjacent the top of said casing, and a removable closure for said casing forming, with said plate, the filtered oil chamber, said standpipe having an opening therethrough communicating with said filtered oil chamber, an oil outlet for said last named chamber, and oil delivery means comprising a pressure feed pipe within the feed chamber having a plurality of outlet openings in its length, whereby oil is delivered to said chamber at a plurality of points and with low velocity.

4. An oil filter embodying therein a casing, a standpipe within and projecting above said casing, a filter body within said casing about said standpipe, said standpipe having a plurality of spaced openings therethrough communicating with said filter body on different horizontal levels, a plate secured to said standpipe for supporting said filter body away from the bottom of said casing to form a feed chamber, means forming a filtered oil chamber above said casing including a partition plate mounted upon said standpipe adjacent the top of said casing, and a removable closure for said casing forming, with said plate, the filtered oil chamber, said standpipe having an opening therethrough communicating with said filtered oil chamber, an oil outlet for said last named chamber, and oil delivery means comprising a pressure feed pipe within the feed chamber having a plurality of outlet openings in its length, whereby oil is delivered to said chamber at a plurality of points and with low velocity.

5. An oil filter embodying therein a casing, a standpipe within and projecting above said casing, a tapered filter body within said casing about said standpipe, a wire mesh tube centrally of said filter body having a close fit with said standpipe, and a wire mesh forming the outer wall of said body, said standpipe having a plurality of spaced openings therethrough communicating with said filter body on different horizontal levels, a plate secured to said standpipe for supporting said filter body away from the bottom of said casing to form a feed chamber below said filter body and of progressively decreasing capacity about said filter body toward the top thereof, said plate being engageable by said tube and the contiguous portion of the bottom of said filter body, means forming a filtered oil chamber above said casing including a partition plate mounted upon said standpipe adjacent the top of said casing, and a removable closure for said casing forming, with said plate, the filtered oil chamber, said standpipe having an opening therethrough communicating with said filtered oil chamber, an oil outlet for said last named chamber, and oil delivery means comprising a pressure feed pipe within the feed chamber having a plurality of outlet openings in its length, whereby oil is delivered to said chamber at a plurality of points and with low velocity.

6. An oil filter embodying therein a casing, a standpipe within and projecting above said casing, a filter body having a cylindrical portion adjacent the top thereof and a tapered lower portion within said casing about said standpipe, a band of absorbent material between the cylindrical portion of said body and the wall of said casing, a wire mesh tube centrally of said filter body having a close fit with said standpipe, and a wire mesh forming the outer wall of said body, said standpipe having a plurality of spaced openings therethrough communicating with said filter body on different horizontal levels, means supporting said filter body away from the bottom of said casing to form a feed chamber below said filter body and of progressively decreasing capacity about said filter body toward the top thereof, means forming a filtered oil chamber above said casing including a partition plate mounted upon said standpipe adjacent the top of said casing, and a removable closure for said casing forming, with said plate, the filtered oil chamber, said standpipe having an opening therethrough communicating with said filtered oil chamber, an oil outlet for said last named chamber, and oil delivery means comprising a pressure feed pipe within the feed chamber having a plurality of outlet openings in its length, whereby oil is delivered to said chamber at a plurality of points and with low velocity.

7. An oil filter embodying therein a casing, a standpipe within and projecting above said casing, a filter body having a cylindrical portion adjacent the top thereof and a tapered lower portion within said casing about said standpipe, a band of absorbent material between the cylindrical portion of said body and the wall of said casing, a wire mesh tube centrally of said filter body having a close fit with said standpipe, and a wire mesh forming the outer wall of said body, said standpipe having a plurality of spaced openings therethrough communicating with said filter body on different horizontal levels, a plate secured to said standpipe for supporting said filter body away from the bottom of said casing to form a feed chamber below said filter body and of progressively decreasing capacity about said filter body toward the top thereof, said plate being engageable by said tube and the contiguous portion of the bottom of said filter body, means forming a filtered oil chamber above said casing including a partition plate mounted upon said standpipe adjacent the top of said casing, and a removable closure for said casing forming, with said plate, the filtered oil chamber, said standpipe having an opening therethrough communicating with said filtered oil chamber, an oil outlet for said last named chamber, and oil delivery means comprising a pressure feed pipe within the feed chamber having a plurality of outlet openings in its length, whereby oil is delivered to said chamber at a plurality of points and with low velocity.

8. An oil filter embodying therein a casing, a standpipe within and projecting above said casing, a filter body within said casing about said standpipe, said standpipe having a plurality of spaced openings therethrough communicating with said filter body on different horizontal levels, means supporting said filter body away from the bottom of said casing to form a feed chamber, means forming a filtered oil chamber above said casing including a partition plate mounted upon said standpipe adjacent the top of said casing, and a dome shaped closure for said casing forming, with said plate, the filtered oil chamber, means co-operating with said standpipe and engageable with said closure removably connecting said closure with said casing, means forming a liquid and air tight joint between said closure and said casing, said standpipe having an opening therethrough communicating with said filtered oil chamber, an oil outlet adjacent the bottom of said chamber, and oil delivery means comprising a pressure feed pipe within the feed chamber having a plurality of outlet openings in its length, whereby oil is delivered to said chamber at a plurality of points and with low velocity.

9. An oil filter embodying therein a casing, a standpipe within and projecting above said casing, a filter body within said casing about said standpipe, said standpipe having a plurality of spaced openings therethrough communicating with said filter body on different horizontal levels, means supporting said filter body away from the bottom of said casing to form a feed chamber, means forming a filtered oil chamber above said casing including a partition plate mounted upon said standpipe adjacent the top of said casing, and a dome shaped closure for said casing forming, with said plate, the filtered oil chamber, means co-operating with said standpipe and engageable with said closure removably connecting said closure with said casing, a spring bearing against said plate and said closure, means forming a liquid and air tight joint between said closure and said casing, said standpipe having an opening therethrough communicating with said filtered oil chamber, an oil outlet adjacent the bottom of said chamber, and oil delivery means comprising a pressure feed pipe within the feed chamber having a plurality of outlet openings in its length, whereby oil is delivered to said chamber at a plurality of points and with low velocity.

10. An oil filter embodying therein a casing, a standpipe within, projecting above and opening outwardly of the bottom of said casing, a removable closure for the bottom of said standpipe whereby impurities may be removed therefrom, said standpipe having a plurality of spaced openings therethrough communicating with said filter body on different horizontal levels, means supporting said filter body away from the bottom of said casing to form a feed chamber, means forming a filtered oil chamber above said casing including a partition plate mounted upon said standpipe adjacent the top of said casing, and a removable closure for said casing forming, with said plate, the filtered oil chamber, said standpipe having an opening therethrough communicating with said filtered oil chamber, an oil outlet for said last named chamber, and oil delivery means comprising a pressure feed pipe within the feed chamber having a plurality of outlet openings in its length, whereby oil is delivered to said chamber at a plurality of points and with low velocity.

11. An oil filter embodying therein a casing having a drain opening in the bottom thereof, a removable plug closing said opening, a standpipe within and projecting above said casing, a filter body within said casing about said standpipe, said standpipe having a plurality of spaced openings therethrough communicating with said filter body on different horizontal levels, means supporting said filter body away from the bottom of said casing to form a feed chamber, means forming a filtered oil chamber above said casing including a partition plate mounted upon said standpipe adjacent the top of said casing, and a removable closure for said casing forming, with said plate, the filtered oil chamber, said standpipe having an opening therethrough communicating with said filtered oil chamber, an oil outlet for said last named chamber, and oil delivery means comprising a pressure feed pipe within the feed chamber having a plurality of outlet openings in its length, whereby oil is delivered to said chamber at a plurality of points and with low velocity.

12. An oil filter embodying therein a casing having a drain opening in the bottom thereof, a removable plug closing said opening, a standpipe within, projecting above and opening outwardly of the bottom of said casing, a removable closure for the bottom of said standpipe whereby impurities may be removed therefrom, said standpipe having a plurality of spaced openings therethrough communicating with said filter body on different horizontal levels, means supporting said filter body away from the bottom of said casing to form a feed chamber, means forming a filtered oil chamber above said casing including a partition plate mounted upon said standpipe adjacent the top of said casing, and a removable closure for said casing forming, with said plate, the filtered oil chamber, said standpipe having an opening therethrough communicating with said filtered oil chamber, an oil outlet for said last named chamber, and oil delivery means comprising a pressure feed pipe within the feed chamber having a plurality of outlet openings in its length, whereby oil is delivered to said chamber at a plurality of points and with low velocity.

ALFRED W. KROGMAN.